United States Patent Office 3,712,828
Patented Jan. 23, 1973

3,712,828
APPLICATION OF ADHESIVE COATING TO ISOTACTIC POLYPROPYLENE AND COMPOSITION THEREFOR
Jean C. Bernard and Pierre J. Pascal, Martigues, France assignors to Naphtachimie, Paris, France
No Drawing. Filed June 25, 1970, Ser. No. 49,943
Claims priority, application France, July 1, 1969, 6922101
Int. Cl. B32b 27/32; B44d 1/40; C08f 15/04
U.S. Cl. 117—47 A
8 Claims

ABSTRACT OF THE DISCLOSURE

This invention is addressed to the application of an organic adhesive coating to plastic compositions containing isotactic polypropylene wherein articles formed of a polymeric composition selected from the group consisting of a mixture of from 75% to 97% by weight isotactic polypropylene and 3–25% of an olefin copolymer having low crystallinity and a graft copolymer formed of from 75% to 97% by weight isotactic polypropylene onto which is grafted 3–25% by weight of a copolymer of ethylene and propylene containing more than 10% by weight ethylene are coated with an adhesive material such as organic paints or adhesives.

---

This invention relates to the application of organic adhesive coatings, such as paints or adhesives, onto plastic materials formed of isotactic polypropylene.

It is known that isotactic polypropylene has a number of properties, such as thermal stability and resistance to mechanical, chemical and atmospheric agents, which render it attractive for use in the manufacture of articles which are molded, shaped or exttruded. In certain of these applications, particularly in the manufacture of accessories for road vehicles, of aeronautical accessories and of appliances for household use, it is frequently desirable to provide such articles with a coating of a paint. The coating should be adherent to the isotactic polypropylene and at the same time be continuous, at least as to the parts which are visible. In addition, it must have a pleasing appearance.

For other application, it is desirable to be able to produce by means of adhesives articles or bodies having complex shapes or which have large thicknesses or to produce composite articles with other materials or to be able to make repairs to provide assemblies formed of polypropylene having high mechanical resistance properties.

However, it is known that isotactic polypropylene is not suited for use in the manufacture of bodies or articles which can be suitably coated with an organic coating of satisfactory quality, particularly due to the inability to establish a strong bonding relationship or adhesion between the surface of the isotactic polypropylene and the organic coating.

It is accordingly an object of the present invention to produce and to provide a method for producing an article formed of isotactic polypropylene having an organic coating on at least one surface thereof which strongly adheres to the isotactic polypropylene.

The concepts of the present invention reside in an article formed of a certain polymeric composition having a coating of an organic adhesive, such as paint or adhesive, on at least one surface of the article. It has been found that a polymeric composition comprising either a mixture of from 75% to 97% by weight isotactic polypropylene and 3 to 25% by weight of an olefin copolymer having low crystallinity, such as a copolymer of ethylene and propylene containing more than 10% by weight ethylene, or a copolymer of isobutene with isoprene and/or butadiene in which the isobutene content is greater than 90% by weight; or a graft polymer of 75% to 97% isotactic polypropylene onto which has been grafted 3 to 25% by weight of a mixture of ethylene and propylene containing more than 10% by weight ethylene can be formed into articles and coated with an organic adhesive which becomes firmly bonded to the polymeric substrate.

Mixtures of the isotactic polypropylene and one of the copolymers having low crystallinity described above can be prepared in accordance with any of a variety of known techniques. It is frequently preferred to mix the components of the mixture in powder form, and mixing them at a temperature in excess of the softening points of each of the constituents.

The graft polymers described above can be prepared by carrying out the polymerization reaction in successive sequences in which propylene is first polymerized alone, and then a mixture of ethylene and propylene is polymerized in the presence of the product of the first stage of the sequence. The polymerization reaction is carried out in the presence of the well known Ziegler catalysts.

By way of modification, it has been found that the adherence of the coating to an article formed of one of the foregoing compositions can be significantly improved by incorporating into the polymeric material an amount up to 2% by weight, and preferably 0.1 to 0.5% by weight, of at least one organic derivative of nitrogen. Suitable organic nitrogen derivatives include amines or amides containing at least one aliphatic chain of at least 6 carbon atoms and at least one oxygen atom in the form of a hydroxy, an alkoxy or an acyl group.

Preferred organic nitrogen derivatives are those having the general formula:

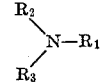

wherein $R_1$ is hydrogen or alkyl containing at least 6 carbon atoms, and preferably 6 to 20 carbon atoms, such as hexyl, octyl, decyl, dodecyl, tetradecyl, octadecyl, etc.; $R_2$ is hydrogen, alkyl containing at least 6 carbon atoms, and preferably 6 to 20 carbon atoms, such as the alkyl groups described above, hydroxy alkyl groups having the formula:

$$HO-C_nH_{2n}-$$

wherein $n$ is an integer of at least 2, and preferably 2 to 12, as represented by 2-hydroxy ethyl, 3-hydroxy propyl, 4-hydroxybutyl, 6-hydroxyhexyl, etc.; an amide group having the formula:

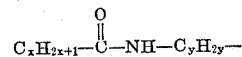

wherein $x$ and $y$ are integers of at least 5, and preferably 5 to 20, as represented by the amide group derived from N-pentyl hexanamide, N-pentyl pentanamide, N-hexyl octanamide, N-octyl decanamide, N-octyl lauryl amide, N-dodecyl stearyl amide, etc.; or a hydroxy ether group having the formula:

$$C_aH_{2a+1}-O-(C_bH_{2b-2}-OH)-CH_2-$$

wherein $a$ is an integer of at least 6, and preferably 6 to 20 and $b$ is an integer from 2 to 3, such as 3-hexyloxy-2-hydroxypropyl, 3-octyloxy-2-hydroxypropyl, 3-decyloxy-2-hydroxypropyl, 4-octyloxy-3-hydroxybutyl, 4-dodecyloxy-3-hydroxybutyl, etc.; and, $R_3$ is a hydroxy alkyl having the formula:

$$HO-C_nH_{2n}-$$

wherein n has the values set forth above, or an acyl group having the formula:

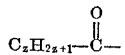

wherein z is an integer of at least 5, and preferably 5 to 20 carbon atoms. Representative acyl groups include hexanoyl, octanoyl, decanoyl, dodecanoyl, etc.

The most preferred of the above nitrogen derivatives used in accordance with the practice of the present invention include tertiary amines of the formula:

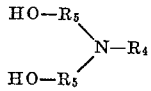

wherein $R_4$ is alkyl containing 12 to 16 carbon atoms (e.g. dodecyl, tridecyl, tetradecyl, etc.), $R_5$ are each alkylene containing 2 to 6 carbon atoms (e.g. ethylene, trimethylene, tetramethylene, hexamethylene, etc.). Representative of the foregoing are N,N-bis-(2-hydroxylethyl) dodecyl amine, N,N-bis-(3-hydroxypropyl)dodecylamine, N-(2-hydroxyethyl)-N-(3-hydroxypropyl)dodecyl amine, N,N-bis-(2-hydroxyethyl)tetradecylamine and a variety of others.

Also included in the preferred nitrogen derivatives are secondary amines of the general formula:

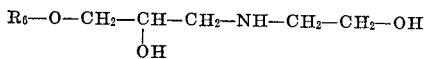

wherein $R_6$ is alkyl containing 8 to 19 carbon atoms such as octyl, decyl, dodecyl, tetradecyl, etc. Representative compounds falling within the above general formula include N-(3-dodecyloxy-2-hydroxypropyl) ethanolamine, N-(3-octyloxy-2-hydroxypropyl) ethanolamine, etc.

Also included in the preferred organic nitrogen derivatives are amides of the formula:

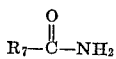

wherein $R_1$ is alkyl containing 5 to 17 carbon atoms. Representative amides include hexanamide, octanamide, lauryl amide, stearyl amide, etc.

Also included are diamides of the general formula:

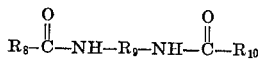

wherein $R_8$ and $R_{10}$ are each alkyl containing 5 to 17 carbon atoms, such as hexyl, octyl, decyl, dodecyl, tetradecyl, etc., and $R_9$ is methylene or ethylene. Illustrative of the foregoing amides are methylene di-laurylamide, ethylene di-laurylamide, methylene di-palmityl amide, ethylene di-stearyl amide, methylene di-stearyl amide, etc.

The foregoing organic nitrogen derivatives can be incorporated into the polymeric or plastic material by a number of well known techniques. For example, the components can be mixed, and then passed through a mixing device, such as a mixer of the cylinder type or a screw type, at a temperature in excess of the softening points to insure uniform distribution of the nitrogen compound throughout the polymeric material.

If desired, a variety of the usual polypropylene additives, such as stabilizers, neutralizers, colorants and/or mineral charges, can be added to the plastic materials.

The plastic or polymer compositions described above can be formed into articles for coating in accordance with the present invention by, for example, injection molding techniques or compression. If desired, the resulting article can be treated prior to coating by, for example, degreasing and/or attack by acids, such as a phosphosulphochromic mixture.

After rinsing and drying, the article can be painted with one or two coats in accordance with the usual methods for applying paints as represented by spraying, brushing or dipping. For this purpose, use can be made of conventional paints of the type applied to non-porous surfaces, particularly acrylic, glycerophthalic, melamine or cellulosic type paints.

Upon drying, the paint coating has a pleasing appearance and exhibits good adherence to the isotactic polypropylene-containing polymeric material forming the substrate, particularly where the polymeric material has been formulated to include one or more of the foregoing organic nitrogen derivatives.

If an assembly by means of gluing is desired, the procedure to be followed is the same as that for painting. Thus, the adhesive is applied in the place of the paint, and the other piece or pieces of the final assembly glued in the usual manner. As the glue, use can be made of glues currently in use of the type which can be applied to non-porous surfaces, particularly contact adhesives such as solutions or glues which harden by polymerization such as epoxy adhesives.

Having described the basic concepts of the invention, reference is now made to the following examples which are provided by way of illustration, and not by way of limitation, of the practice of the invention.

EXAMPLE 1

A graft copolymer based on isotactic polypropylene is prepared by sequence polymerization in the presence of a Ziegler type catalyst. In carrying out the sequence polymerization, propylene is first polymerized alone to form isotactic polypropylene, onto which is grafted a copolymer of ethylene and propylene, with the ethylene constituting 80% by weight of the ethylene-propylene mixture.

The graft copolymer is thereafter separated from the reaction mixture, and is found to contain 10% by weight of the ethylene-propylene copolymer grafted to the isotactic polypropylene, based upon the total weight of the graft copolymer.

The polymer obtained is stabilized by 0.25% by weight of dilaurylthiodipropionate and 0.25% by weight of octadecylic ester of $\beta(3'-5'$ ditertiarybutyl-4'-hydroxyphenyl) propionic acid.

Without the addition of other adjuvants to the composition, the composition is formed into sheets by molding at 230° C. under a pressure of 130 bars. These sheets are then cut up into parallelepiped-shaped test pieces of 25 x 125 x 4 mm.

These test pieces are subjected to a preliminary treatment which consists of the following steps:

(1) Degreasing with a soda lye;
(2) Rinsing with cold water;
(3) Neutralization with an aqueous solution of bisulphate of soda;
(4) Rinsing with cold water;
(5) Attack for 1–5 minutes, at 80° C., by a phosphosulpho-chromic mixture comprising:

(a) 53% by weight of sulphuric acid at 98%;
(b) 22% by weight of phosphoric acid at 85%;
(c) 2% by weight of chromic acid as $CrO_3$;
(d) 23% of distilled water;

(6) Rinsing with cold water;
(7) Drying.

Subsequently, a coat of a quick-drying glycerophthalic paint is applied onto the test pieces by means of a spray gun.

After hardening of the paint, the adherence of the film of paint is determined in the following manner.

The film of paint is cut into as far as the substratum of polymer by means of a razor, marking out regular squares which divide the film into 100 squares of 1 mm. at the side on a surface of 1 cm.². Onto these squares is glued a small piece of contact adhesive tape: this is pressed, then is quickly ripped off again. The number of squares which do not become unglued is counted. This number expresses, in percentage, the adherence of the paint.

The results of this measuring, as a function of the duration of the attack by the phospho-sulpho-chromic mixture, are given in Table I (experiments 1a, 1b, 1c). Table I likewise shows the results of painting experiments carried out under the same conditions as above, starting with test pieces consisting of isotactic homopolymeric polypropylene, stabilized in the same maner as the polymer in the experiments 1 (reference tests 0a, 0b and 0c).

By comparing the results of the tests in groups 0 and 1, it can be seen that the adherence of the paint in the tests of group 1 is considerably increased in relation to the tests in group 0 for the same duration of treatment with the phospho-sulpho-chromic mixture. It can also be seen that with the use of copolymers according to the invention, it is possible to reduce to one minute the duration of the treatment with the phospho-sulpho-chromic mixture, while still obtaining in adherence which is considerably superior to that obtained in the case of polypropylene homopolymer treated for 20 minutes.

EXAMPLES 2, 3 and 4

The polymeric material used in these examples is the copolymer described in Example 1, in which there are incorporated, in addition to the stabilizers, one of the following compounds:

Tests 2a, 2b and 2c 0.5% by weight of N-(3-dodecyloxy-2-hydroxypropyl) ethanolamine Tests 3a, 3b and 3c 0.5% by weight of N-N'bis(2 - hydroxyethyl) alkyl $C_{12}-C_{18}$) amine Tests 4a, 4b and 4c 0.25% by weight of N-N'ethylene distearamide.

It can be seen from the results of Table I that in all these tests, the adherence of the paint is substantially increased in relation to the results of Example 1.

EXAMPLE 5

The polymeric material used in this example is the copolymer described in Example 1. Sheets of this copolymer are formed into dumbbell-shaped test pieces having the following dimensions:

| | Mm. |
|---|---|
| Total length | 150.00 |
| Calibrated length | 60.00 |
| Width of the calibrated part | 10.00 |
| Thickness of the calibrated part | 1.98 |

These test pieces are divided into sections in the middle of the calibrated part and the sectioned ends are subjected to a preliminary treatment as in Example 1. Then, by superimposing on a surface of 0.5 cm.², the two sectioned ends of the test piece are glued, by means of an epoxy adhesive. After hardening of the glue, a tractional test is carried out with a drawing speed of 120 mm. per minute. The tractional resistance to breaking is measured.

In Table II, there is shown the results of the various test. The test 5o, given by way of a reference example, relates to a non-sectioned test piece. Test 5a relates to a test piece reglued without preliminary treatment by the phospho-sulpho-chromic mixture. The tests 5b and 5c relate to test pieces treated for 1 and 2 minutes, respectively, by the phospho-sulpho-chromic mixture. Also, there is indicated in brackets, below the resistances to breaking thus measured, the values obtained for the test pieces consisting of polypropylene homopolymer, which, in each case, have been subjected to the same treatment.

It can be seen from Table II that in all the cases of gluing, the copolymer of the invention shows a resistance to breaking which is greater than that of the polypropylene homopolymer, even though the intrinsic resistance to breaking of the latter is greater than that of the copolymer. It can also be seen that the treatment by the phospho-sulpho-chromic mixure substantially increases the resistance to breaking.

TABLE I

| Test No. | Polymer | Duration of the treatment by the phos-phosulpho-chromic mixture (in minutes) | Adherence, percent |
|---|---|---|---|
| 0a | Polypropylene homopolymer | 0 | 0 |
| 0b | | 20 | <50 |
| 0c | | 5 | 31 |
| 1a | Sequenced co-polymer of propylene and of an ethylene-propylene mixture. | 5 | 100 |
| 1b | | 2 | 77 |
| 1c | | 1 | 82 |
| 2a | Co-polymer of tests 1+ 0.5% by weight of N-(3-dodecyloxy-2 hydroxypropyl) ethanolamine. | 5 | 100 |
| 2b | | 2 | 99 |
| 2c | | 1 | 100 |
| 3a | Co-polymer of tests 1+ 0.5% by weight of N-N' bis (2-hydroxyethyl) alkyl ($C_{12}$–$C_{18}$) amine. | 5 | 93 |
| 3b | | 2 | 96 |
| 3c | | 1 | 89 |
| 4a | Co-polymer of tests 1+ 0.25% by weight of N-N' ethylene bis stearamide. | 5 | 100 |
| 4b | | 2 | 95 |
| 4c | | 1 | 90 |

TABLE II

| Test No. | | Duration of the attack by a phospho-sulphochromic mixture | Tractional resistance to breaking, kgf |
|---|---|---|---|
| 5o | Non-sectioned test piece | | 56 (69) |
| 5a | Sectioned test piece | Zero | 9.5 (5.2) |
| 5b | do | 1 | 13.5 (9.6) |
| 5c | do | 2 | 19 (15) |

It will be understood that various changes and modifications can be made in the details of formulation, procedure and use without departing from the spirit of the invention, especially as defined in the following claims.

We claim:

1. In the method for coating an article formed of a polymeric material selected from the group consisting of (1) a mixture of from 75% to 97% by weight isotactic polypropylene and 3% to 25% of an olefin copolymer having low crystallinity selected from the group consisting of copolymers of ethylene and propylene containing more than 10% by weight ethylene and a copolymer of isobutene and a diolefin selected from the group consisting of isoprene, butadiene and mixtures thereof in which the isobutene content is higher than 90% by weight; and (2) a block copolymer formed of 75% to 97% by weight isotactic polypropylene onto which is sequenced a copolymer of ethylene and propylene containing more than 10% by weight ethylene with an organic paint or organic adhesive, the improvement comprising blending from 0.1 to 2% by weight of an organic nitrogen derivative selected from the group consisting of amines and amides containing at least one aliphatic chain of at least 6 carbon atoms and at least one oxygen in the form of a group selected from the group consisting of a hydroxy group, an alkoxy group and an acyl group with said polymeric material and then coating a surface of an article formed from the resulting blend with the organic paint or organic adhesive.

2. A method as defined in claim 1 wherein the organic nitrogen derivative has the formula

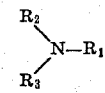

wherein $R_1$ is selected from the group consisting of hydrogen or alkyl containing at least 6 carbon atoms; $R_2$ is selected from the group consisting of hydrogen, alkyl containing at least 6 carbon atoms, a hydroxyalkyl group having the formula:

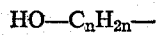

HO—$C_nH_{2n}$— wherein $n$ is an integer of at least 2, an amide group having the formula:

$$C_xH_{2x+1}-\overset{\overset{O}{\|}}{C}-NH-C_yH_{2y}-$$

wherein $x$ and $y$ are integers of at least 5, and a hydroxy ether group having the formula:

$$C_aH_{2a+1}-O-(C_bH_{2b-2}-OH)-CH_2-$$

wherein $a$ is an integer of at least 6 and $b$ is an integer from 2 to 3; $R_3$ is selected from the group consisting of a hydroxyalkyl group having the formula:

$$HO-C_nH_{2n}-$$

wherein $n$ has the values set forth above, and an acyl group having the formula:

$$C_zH_{2z+1}-\overset{\overset{O}{\|}}{C}-$$

wherein $z$ is an integer of at least 5.

3. A method as defined in claim 2 wherein the organic nitrogen derivative is present in an amount corresponding to 0.1 to 0.5% by weight based on the weight of the polymeric material.

4. A method as defined in claim 1 which includes the step of treating the article with at least one acid prior to coating.

5. A method as defined in claim 4 wherein the acid is a mixture of phosphoric, sulfuric and chromic acids.

6. A method as defined in claim 1 which includes the step of degreasing the article prior to coating.

7. A method as defined in claim 1 wherein the organic paint is acrylic, glycerophthalic, melamine or cellulosic.

8. A method as defined in claim 1 wherein the organic adhesive is an organic epoxy adhesive.

References Cited

UNITED STATES PATENTS

| | | | |
|---|---|---|---|
| 3,215,487 | 11/1965 | Cappuccio et al. | 8—115.5 |
| 3,354,239 | 11/1967 | Short | 260—878 R |
| 3,338,986 | 8/1967 | Leibson, et al. | 260—878 R |
| 3,301,921 | 1/1967 | Short | 260—878 R |
| 3,131,990 | 5/1964 | Bonvicini et al. | 260—878 R |
| 3,200,173 | 8/1965 | Schilling | 260—878 B |
| 3,036,987 | 5/1962 | Ranalli | 117—138.8 E |
| 3,293,326 | 12/1966 | Jezl et al. | 260—878 R |
| 2,971,858 | 2/1961 | Giulio | 117—12 |
| 3,318,976 | 5/1967 | Short | 260—878 B |
| 3,262,992 | 7/1966 | Holzer et al. | 260—878 B |
| 3,326,742 | 6/1967 | Shepherd | 17—47 |

WILLIAM D. MARTIN, Primary Examiner

W. R. TRENOR, Assistant Examiner

U.S. Cl. X.R.

117—12, 118, 138.8 F; 260—876, 878 B, 878 R